(12) United States Patent
Chen et al.

(10) Patent No.: US 10,960,812 B2
(45) Date of Patent: Mar. 30, 2021

(54) FULLY TRANSPARENT LUGGAGE RACK HAVING COLORED ILLUMINANT AND VEHICLE

(71) Applicant: WINBO-DONGJIAN AUTOMOTIVE TECHNOLOGY CO., LTD., Foshan (CN)

(72) Inventors: Yongbo Chen, Foshan (CN); Zhihai Zhang, Foshan (CN); Wei Hu, Foshan (CN); Wenxiang He, Foshan (CN); Jie Yang, Foshan (CN); Weiting He, Foshan (CN)

(73) Assignee: WINBO-DONGJIAN AUTOMOTIVE TECHNOLOGY CO., LTD., Foshan (CN)

( * ) Notice: Subject to any disclaimer, the term of this patent is extended or adjusted under 35 U.S.C. 154(b) by 0 days.

(21) Appl. No.: 16/713,015

(22) Filed: Dec. 13, 2019

(65) Prior Publication Data
US 2020/0114808 A1  Apr. 16, 2020

Related U.S. Application Data

(63) Continuation of application No. PCT/CN2017/099123, filed on Aug. 25, 2017.

(30) Foreign Application Priority Data

Jun. 14, 2017 (CN) .......................... 2017 1 0448248

(51) Int. Cl.
*B60Q 1/26* (2006.01)
*B60R 9/04* (2006.01)

(52) U.S. Cl.
CPC .............. *B60Q 1/2611* (2013.01); *B60R 9/04* (2013.01); *B60Q 1/2661* (2013.01)

(58) Field of Classification Search
CPC ................................ B60Q 1/2611; B60R 9/04
(Continued)

(56) References Cited

U.S. PATENT DOCUMENTS 4,269,339 A * 5/1981 Bott .......................... B60R 9/04
224/309
4,800,470 A * 1/1989 Hartsaw ............... B60Q 1/0011
362/249.12
(Continued)

FOREIGN PATENT DOCUMENTS

CN   201176143 Y   1/2009
CN   202782955 U   3/2013
(Continued)

OTHER PUBLICATIONS

International search report,PCT/CN2017/099123, dated Jan. 25, 2018 (3 pages).
(Continued)

*Primary Examiner* — Christopher M Raabe

(57) ABSTRACT

A fully transparent luggage rack having a color illuminant includes a transparent longitudinal rod, an illuminant, a mounting base, a wire and a hollow bolt. The longitudinal rod is connected to the mounting base; the illuminant is arranged in the longitudinal rod; the mounting base is also fixed to a vehicle roof by means of the hollow bolt; and the wire penetrates the hollow bolt and is connected to the illuminant. A vehicle which is arranged with the fully transparent luggage rack having the color illuminant may be provided.

18 Claims, 2 Drawing Sheets

(58) Field of Classification Search
USPC .......................................................... 362/493
See application file for complete search history.

(56) References Cited

U.S. PATENT DOCUMENTS

| | | | | |
|---|---|---|---|---|
| 6,114,954 | A * | 9/2000 | Palett | B60R 9/00 |
| | | | | 224/321 |
| 2011/0240695 | A1 * | 10/2011 | Aftanas | B60Q 1/2661 |
| | | | | 224/311 |
| 2012/0031939 | A1 * | 2/2012 | Jutila | B60Q 1/24 |
| | | | | 224/326 |
| 2014/0292040 | A1 * | 10/2014 | Shibutani | B60R 9/048 |
| | | | | 296/210 |
| 2015/0138803 | A1 * | 5/2015 | Salter | F21S 41/16 |
| | | | | 362/510 |
| 2017/0120805 | A1 * | 5/2017 | Marchese | B60Q 1/24 |
| 2020/0114809 | A1 * | 4/2020 | Chen | B60R 9/04 |
| 2020/0114829 | A1 * | 4/2020 | Chen | B60Q 1/2611 |

FOREIGN PATENT DOCUMENTS

| | | |
|---|---|---|
| CN | 203020167 U | 6/2013 |
| CN | 104691452 A | 6/2015 |
| CN | 105480146 A | 4/2016 |
| CN | 205417414 U | 8/2016 |
| CN | 205706475 U | 11/2016 |
| CN | 106740517 A | 5/2017 |
| CN | 206926594 U | 1/2018 |
| JP | 1997024772 A | 1/1997 |
| WO | WO2018227764 A1 | 12/2013 |

OTHER PUBLICATIONS

Australian Examination report, Australian application No. 2 7418735, dated Oct. 13, 2020 (4 pages).

* cited by examiner

FULLY TRANSPARENT LUGGAGE RACK HAVING COLORED ILLUMINANT AND VEHICLE

CROSS REFERENCE TO RELATED APPLICATIONS

The present application is a continuation-application of International (PCT) Patent Application No. PCT/CN2017/099123 filed on Aug. 25, 2017, which claims foreign priority of Chinese Patent Application No. 201710448248.8, filed on Jun. 14, 2017, in the National Intellectual Property Administration of China, the entire contents of which are hereby incorporated by reference in their entireties.

TECHNICAL FIELD

The present disclosure relates to the field of vehicle parts, and in particular to a fully transparent luggage rack having a colored illuminant and a vehicle.

BACKGROUND

A longitudinal rod of a roof luggage rack may typically be arranged on a top of a suburban utility vehicle (SUV). The longitudinal rod of the roof luggage rack may provide a more aesthetic appearance for the vehicle and further carry articles. The longitudinal rod of the roof luggage rack may be assembled with a cross rod or a luggage box, such that articles of a user, such as a bicycle, a bag, or the like, may be carried on the top of the vehicle to allow a convenient trip for the user.

However, luggage racks in the related art may substantially be arranged for carrying articles, but not to provide an aesthetic appearance or enhance a visual effect. Some luggage racks in a current market may be arranged with a headlight for the purposes of lighting a front of the vehicle. The luggage rack itself may not be decorated by the light.

SUMMARY OF THE DISCLOSURE

To solve at least a part of the above-mentioned problem, the present disclosure may provide a fully transparent luggage rack having a colored illuminant and a vehicle. A light source may be arranged in an inside of the luggage rack, and the luggage rack may be fully transparent. Therefore, the luggage rack may provide a dazzling lighting effect.

According to the present disclosure, the fully transparent luggage rack having the colored illuminant may include a transparent longitudinal rod, at least one illuminant, at least one mounting base, at least one wire, and at least one hollow bolt. The transparent longitudinal rod may be connected to the at least one mounting base. The at least one illuminant may be arranged in an inside of the transparent longitudinal rod. The at least one mounting base may be fixed on a top of a vehicle via the at least one hollow bolt. Each of the at least one wire may extend through one hollow bolt and may be connected to one illuminant.

In some embodiments, two ends of a side of the transparent longitudinal rod close to the top of the vehicle may be arranged with two rubber pads.

In some embodiments, the side of the transparent longitudinal rod close to the top of the vehicle may be arranged with a rubber strip along a length direction of the transparent longitudinal rod.

In some embodiments, each of the at least one illuminant may be in one-to-one correspondence with the at least one mounting base.

In some embodiments, more than one illuminants may be arranged, and the more than one illuminants may be spaced apart from each other.

In some embodiments, the transparent longitudinal rod may define a receiving chamber, and the plurality of illuminants may be arranged in the receiving chamber.

In some embodiments, the bottom of the transparent longitudinal rod may define at least one through hole, and each of the at least one wire extending through the hollow bolt may further extend through one through hole to connect to the illuminant.

In some embodiments, the transparent longitudinal rod may be connected to the mounting base in a detachable manner.

In some embodiments, the illuminant may be a light bar.

According to another aspect of the present disclosure, a vehicle may be provided. The vehicle may include the above-mentioned fully transparent luggage rack.

Two ends of a side of the transparent longitudinal rod close to a top of the vehicle may be arranged with two rubber pads.

The side of the transparent longitudinal rod close to the top of the vehicle may be arranged a rubber strip along a length direction of the transparent longitudinal rod.

A plurality of illuminants may be arranged, and the plurality of illuminants may be spaced apart from each other.

A bottom of the transparent longitudinal rod may define a receiving chamber, and the plurality of illuminants may be arranged in the receiving chamber.

The bottom of the transparent longitudinal rod may define a through hole, and the wire extending through the hollow bolt may further extend through the through hole to connect to the illuminant.

The transparent longitudinal rod may be connected to the mounting base in a detachable manner.

The illuminant may be a light bar or a light strip.

According to the present disclosure, the fully transparent luggage rack having the colored illuminant may be provided. The light bar may be arranged in an inside of the transparent luggage rack to enhance the lighting effect, such that the luggage rack may provide a dazzling lighting effect, providing an aesthetic appearance for the luggage rack. Further, when travelers are driving at night, the light emitting from the inside of the luggage rack may illuminate roads to provide a better view for the travelers; and when the travelers stop the vehicle at night, the light emitting from the inside of the luggage rack may enable the travelers to check articles or bags arranged on the luggage rack on the top of the vehicle and move or detach the articles or the bags if required.

The fully transparent luggage rack having the colored illuminant may have a simple structure for an easy assembling. As the hollow bolt may be provided to arrange the mounting base, the wire may extend from an inside of the vehicle through the hollow bolt to reach the inside of the luggage rack, such that the wire may be protected from being exposed to an outside, and the luggage rack may look tidy.

BRIEF DESCRIPTION OF THE DRAWINGS

In order to further clearly demonstrate technical solutions provided by the present disclosure and technical solutions in the related art, drawings for illustrating embodiments or related art will be described briefly. Obviously, drawings in the following description illustrate only embodiments of the present disclosure. For ordinary skilled in the art, without creative endeavor, other drawings may be obtained based on the provided drawings.

FIG. 3b is a top view of the hollow bolt of the fully transparent luggage rack having the colored illuminant shown in FIG. 3a.

DETAILED DESCRIPTION

Figure 1:
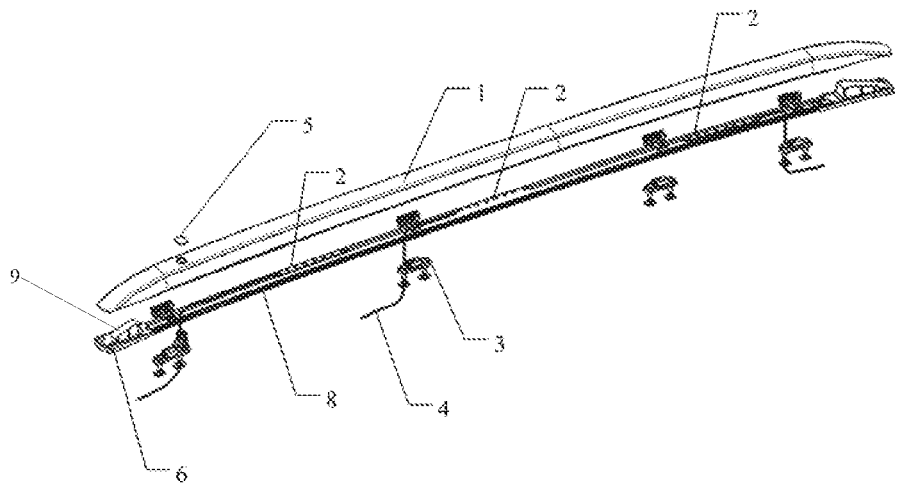
FIG. 1 is an explosive perspective view of an entire structure of a fully transparent luggage rack having a colored illuminant according to an embodiment of the present disclosure.

According to the present disclosure, a fully transparent luggage rack having a colored illuminant and a vehicle may be provided. A transparent plastic may be used as a transparent medium. An illuminant (a light bar, a light bead, a light strip, or the like) may be arranged in an inside of the luggage rack. A light emitting from the illuminant may transmit through the transparent plastic, reaching an outside of the luggage rack, giving a dazzling lighting effect.

Technical solutions of the present disclosure may be clearly illustrated in details by referring to the drawings. Obviously, the illustrated embodiments are only a part of but not all of the embodiments. Based on the embodiments of the present disclosure, other embodiments obtained by the ordinary skilled in the related art without any creative work shall be within the scope of the present disclosure.

The fully transparent luggage rack having the colored illuminant may include a transparent longitudinal rod, at least one illuminant, at least one mounting base, at least one wire, and at least one hollow bolt.

The transparent longitudinal rod may define a receiving chamber, and connect to the at least one mounting base.

The at least one illuminant may be arranged in the receiving chamber of the transparent longitudinal rod. The at least one illuminant may include at least one light bar, at least one light strip, or combination of at least one light bar and at least one light strip.

The at least one mounting base may be fixed on a top of a vehicle via the at least one hollow bolt.

Each of the at least one wire may extend through one hollow bolt and connect to one illuminant.

Figure 2:
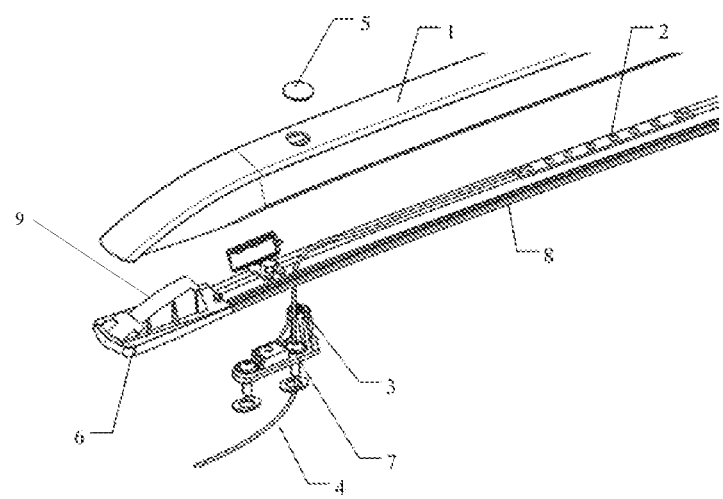
FIG. 2 is an explosive perspective view of a partial structure of a fully transparent luggage rack having a colored illuminant according to an embodiment of the present disclosure.

The fully transparent luggage rack having the colored illuminant may be illustrated in details by referring to FIGS. 1 to 3. Specifically, the fully transparent luggage rack having the colored illuminant may include a transparent longitudinal rod 1, at least one light bar 2, at least one mounting base 3, at least one wire 4, a rubber plug 5, a rubber pad 6, and at least one hollow bolt 7.

The transparent longitudinal rod 1 may be made of plastics, and may be manufactured as an integral. The transparent longitudinal rod 1 may define a receiving chamber, and a bottom of the transparent longitudinal rod 1 may define a through hole. The receiving chamber of the transparent longitudinal rod 1 may communicate with an outside through the through hole.

An inner wall of the transparent longitudinal rod 1 may be electroplated with a silver layer. Therefore, when the light bar 2 is not illuminating, the entire luggage rack may appear to be silver when observing from an outside. When the light bar 2 is illuminating, the silver layer may not block most of the light, and, by virtue of the plastics, most of light may transmit through the plastics to the outside, giving a dazzling lighting effect.

A top of the transparent longitudinal rod 1 may be arranged with a rubber plug 5.

Two ends of the bottom of the transparent longitudinal rod 1 may recess inwardly to define two buckle recesses. Two buckle components 9 may be provided. A side of each buckle components may have a protrusion, and the protrusion may be received into one buckle recess, such that the two buckle components may be buckle-connected to the two ends of the transparent longitudinal rod 1. An opposing side of each buckle may be arranged with a rubber pad 6, and a rubber strip 8 may be arranged along a length direction of the transparent longitudinal rod 1 to connect the two buckle components. In such a way, two rubber pads 6 and the rubber strip 8 may be arranged on the bottom of the transparent longitudinal rod 1 facing towards the top of the vehicle, and frictions may be generated between the two rubber pads 6 and the top of the vehicle and between the rubber strip 8 and the top of the vehicle. Therefore, the transparent longitudinal rod 1 may be arranged on the top of the vehicle tightly, and waterproof of the transparent longitudinal rod 1 may be achieved.

The light bar 2 may be arranged in the receiving chamber of the transparent longitudinal rod 1. According to an actual demand, a plurality of light bars may be arranged.

When the plurality of light bars 2 are arranged in the receiving chamber of the transparent longitudinal rod 1, the plurality of light bars 2 may be placed into the receiving chamber through the through hole defined in the bottom of the transparent longitudinal rod 1. The bottom of the transparent longitudinal rod 1 may further define a plurality of screw holes, and the plurality of screw holes may correspond to the plurality of light bars 2. Further, screws may be arranged to screw through the screw holes to fix the plurality of light bars. In such a way, the plurality of light bars 2 may not move during driving.

The present disclosure may only present an example showing the number of the light bars 2 and one way of arranging the light bars 2. In the present embodiment, the light bars 2 may be uniformly distributed in the receiving chamber of the transparent longitudinal rod 1. Alternatively, the light bars 2 may be arranged at the two ends of the transparent luggage rack, illuminating towards a middle of the transparent luggage rack. Further, a light strip or other illuminating members may be arranged.

The number of the mounting bases 3 may be equal to the number of the light bars 2, and each light bar 2 corresponds to a mounting base 3.

The mounting base 3 may be fixed on the top of the vehicle via the hollow bolt 7. To be specific, each mounting base 3 may define two screw holes at two opposing ends, and the two screw holes may extend through the mounting base 3 from a top face to a bottom face of the mounting base 3. The mounting base 3 may further be arranged with a mounting block on the top face between the two opposing ends. The mounting block may define a fixing hole, and the bottom of the transparent longitudinal rod 1 may define a mounting hole corresponding to the fixing hole. Two hollow bolts 7 may extend through the two screw holes to fix the mounting base 3 with the top of the vehicle. A mounting screw may extend through the fixing hole and the mounting hole at the same time to fix the transparent longitudinal rod 1 with the mounting base 3. Further, an edge of one of the two opposing ends may be arranged with a mounting plug, and the mounting plug may extend away from the top face of the mounting base 3. Each mounting plug may be inserted into the through hole defined in the bottom of the longitudinal rod 1 to further prevent the longitudinal rod 1 from sliding with respect to the mounting base 3. The wire 4 may extend through the hollow bolt 7 to connect to the light bar 2.

The mounting base 3 may be connected to the transparent longitudinal rod 1 in a detachable manner, allowing an easy assembling.

Figure 3A:
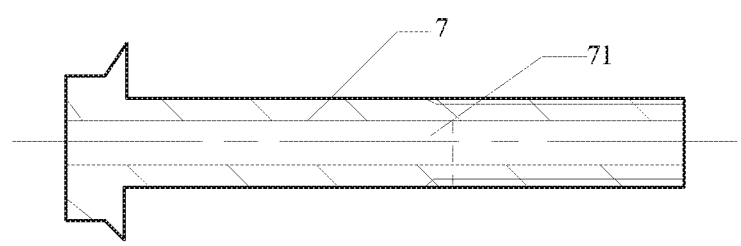
FIG. 3a is a side view of a hollow bolt of the fully transparent luggage rack having the colored illuminant according to an embodiment of the present disclosure.
Figure 3B:
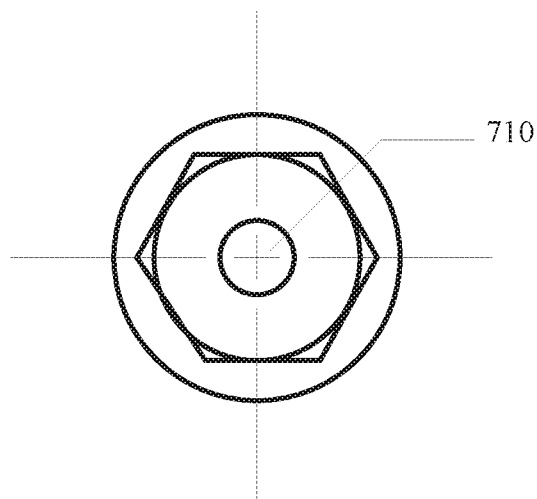

As shown in FIGS. 3*a* and 3*b*, a side view and a top view of the hollow bolt 7 are provided. The hollow bolt 7 may define a channel 71 extending through the hollow bolt 7 along a length direction of the hollow bolt 7. Therefore, a top opening 710 may be defined on a top surface of the hollow bolt 7, and a bottom opening may be defined on a bottom surface of the hollow bolt 7. When the hollow bolt 7 is arranged to fix the mounting base 3 on the top of the vehicle, and when the mounting plug is inserted into the through hole to fix the longitudinal rod 1, a central axis of the channel 71 may overlap with a central axis of the through hole defined in the transparent longitudinal rod 1. Therefore, the wire 4 may be inserted into the channel 71 from the bottom opening, extend through the channel 71, reach to an outside of the hollow bolt 7 from the top opening, and further extend through the through hole to reach the receiving chamber of the transparent longitudinal rod 1 to connect to the light bar 2. In such a way, the wire 4 may not be seen from the outside, and may not impact an outer appearance of the luggage rack.

According to the present embodiment, the wire 4 extends through the hollow bolt 7 and the mounting base 3, the wire 4 may further extend through the through hole defined in the bottom of the transparent longitudinal rod 1 to reach the inside of the transparent longitudinal rod 1 and connect to the light bar 2. When electricity is conducted, the light bar 2 may emit colored lights, transmitting through the transparent longitudinal rod 1 to reach the outside, providing a dazzling lighting effect.

The above-mentioned fully transparent luggage rack having the colored illuminant may be assembled by performing following operations.

Firstly, the mounting base 3 may be arranged on the top of the vehicle via the hollow bolt 7.

Secondly, the wire 4 may extend through the hollow bolt 7. One end of the wire 4 may be guided to an inside of the vehicle, and the other end of the wire 4 may extend through the through hole defined in the bottom of the transparent longitudinal rod 1 to reach the inside of the luggage rack and connect to a contact of the light bar 2. After other wires are connected to the other light bars 2 in a same manner, bolts and specific pads may be provided, wherein the bolts may extend through a hole defined in the mounting base 3 to assemble the transparent longitudinal rod 1 with 4 mounting bases, such that the luggage rack may be fixed on the top of the vehicle.

According to the present disclosure, the fully transparent luggage rack having the colored illuminant may be a provided. The light bar may be arranged in an inside of the transparent luggage rack to enhance the lighting effect, such that the luggage rack may provide a dazzling lighting effect, providing an aesthetic appearance for the luggage rack. Further, during driving at night, the light emitting from the inside of the luggage rack may enable a driver of the vehicle to check articles or bags arranged on the luggage rack on the top of the vehicle and move or detach the articles or the bags.

The fully transparent luggage rack having the colored illuminant may have a simple structure for an easy assembling. As the hollow bolt may be provided to arrange the mounting base, the wire may extend from an inside of the vehicle through the hollow bolt to reach the inside of the luggage rack, such that the wire may be protected from being exposed to an outside, and the luggage rack may look tidy.

For a luggage rack, travelers may desire more than carrying articles. Therefore, the fully transparent luggage rack having a colored illuminant may meet travelers' consumption concepts, having market prospects.

Based on the above-mentioned luggage rack, the present disclosure may further provide a vehicle, including the above-mentioned luggage rack. In an embodiment, the luggage rack may include a transparent longitudinal rod 1, an illuminant 2, a mounting base 3, a wire 4, and a hollow bolt 7. The transparent longitudinal rod 1 may be connected to the mounting base 3. The illuminant 2 may be arranged in an inside of the transparent longitudinal rod 1. The mounting base 3 may be fixed on a top of the vehicle via the hollow bolt 7. The wire 4 may extend through the hollow bolt 7 and connect to the illuminant 2. In the present embodiment, the vehicle may be in any model, such as a two-compartment vehicle, a three-compartment vehicle, an electronic vehicle, an internal combustion engine vehicle or a hybrid vehicle. By arranging the fully transparent luggage rack having a colored illuminant on the vehicle, the light emitting from the inside of the luggage rack may enable travelers to check the articles or bags arranged on the luggage rack during night, such that the articles or bags may be easily moved or detached.

In some embodiments, two ends of a side of the transparent longitudinal rod 1 may be arranged with two rubber pads 6.

In some embodiments, the side of the transparent longitudinal rod 1 may be arranged with a rubber strip 8 along a length direction of the transparent longitudinal rod 1.

In some embodiments, the luggage rack may be arranged with a plurality of illuminants 2, and the plurality of illuminants 2 may be spaced apart from each other.

In some embodiments, the bottom of the transparent longitudinal rod 1 may define a receiving chamber, and the illuminants 2 may be arranged in the receiving chamber.

In some embodiment, the bottom of the transparent longitudinal rod 1 may further define a through hole. The wire 4 extending through the hollow bolt 7 may further extend through the through hole and connect to the illuminant 2.

In some embodiments, the transparent longitudinal rod 1 may be connected to the mounting base 3 in a detachable manner.

In some embodiments, the illuminant 2 may be a light bar or a light strip.

The above-mentioned embodiments are only for the purposes of illustrating technical solutions of the present disclosure, but not to limit the scope of the present disclosure. The ordinary skilled in the related art shall understand that the illustrated technical solutions can be modified, and some technical features of the illustrated technical solutions can be equivalently replaced. The modification and replacement does not allow the essence of the technical solutions to depart from the principle and scope of the present disclosure.

What is claimed is:

1. A fully transparent luggage rack having a colored illuminant, comprising:
    a transparent longitudinal rod, defining a receiving chamber, and having a bottom surface facing towards a top of a vehicle; wherein the bottom surface defines a through hole;
    at least one illuminant, arranged inside the transparent longitudinal rod;
    at least one mounting base and at least one hollow bolt, wherein the at least one mounting base is connected to the transparent longitudinal rod, arranged to extend through the through hole, and fixed on the top of the vehicle via the at least one hollow bolt; and
    at least one wire, wherein the at least one wire is arranged to extend through the at least one hollow bolt to connect to the at least one illuminant.

2. The fully transparent luggage rack having a colored illuminant according to claim 1, wherein two ends of a side of the transparent longitudinal rod close to the top of the vehicle are arranged with two rubber pads.

3. The fully transparent luggage rack having a colored illuminant according to claim 2, wherein the side of the transparent longitudinal rod close to the top of the vehicle is arranged with a rubber strip along a length direction of the transparent longitudinal rod.

4. The fully transparent luggage rack having a colored illuminant according to claim 1, wherein a plurality of illuminants are arranged and spaced apart from each other.

5. The fully transparent luggage rack having a colored illuminant according to claim 1, wherein the at least one illuminant is arranged on a bottom of the transparent longitudinal rod facing towards the receiving chamber.

6. The fully transparent luggage rack having a colored illuminant according to claim 5, wherein the bottom of the transparent longitudinal rod further defines at least one through hole, and the at least one wire extending through the hollow bolt is further arranged to extend through the at least one through hole to connect to the at least one illuminant.

7. The fully transparent luggage rack having a colored illuminant according to claim 1, wherein the transparent longitudinal rod is connected to the at least one mounting base in a detachable manner.

8. The fully transparent luggage rack having a colored illuminant according to claim 1, wherein the at least one illuminant comprises at least one light bar, or at least one light strip, or combination of at least one light bar and at least one light strip.

9. The fully transparent luggage rack having a colored illuminant according to claim 1, wherein an inner wall of the transparent longitudinal rod is electroplated with a silver layer.

10. A vehicle, arranging with a fully transparent luggage rack, wherein the fully transparent luggage rack comprises:
    a transparent longitudinal rod, defining a receiving chamber, and having a bottom surface facing towards a top of a vehicle; wherein the bottom surface defines a through hole;
    at least one illuminant, arranged inside the transparent longitudinal rod;
    at least one mounting base and at least one hollow bolt, wherein the at least one mounting base is connected to the transparent longitudinal rod, arranged to extend through the through hole, and fixed on the top of the vehicle via the at least one hollow bolt; and
    at least one wire, wherein the at least one wire is arranged to extend through one hollow bolt to connect to the at least one illuminant.

11. The vehicle according claim 10, wherein two ends of a side of the transparent longitudinal rod close to the top of the vehicle are arranged with two rubber pads.

12. The vehicle according claim 11, wherein the side of the transparent longitudinal rod close to the top of the vehicle is arranged with a rubber strip along a length direction of the transparent longitudinal rod.

13. The vehicle according claim 10, wherein a plurality of illuminants are arranged and spaced apart from each other.

14. The vehicle according claim 10, wherein the at least one illuminant is arranged on a bottom of the transparent longitudinal rod, facing towards the receiving chamber.

15. The vehicle according to claim 14, wherein the bottom of the transparent longitudinal rod defines at least one through hole, and the at least one wire extending through the at least one hollow bolt is further arranged to extend through the at least one through hole to connect to the at least one illuminant.

16. The vehicle according to claim 10, wherein the transparent longitudinal rod is connected to the at least one mounting base in a detachable manner.

17. The vehicle according to claim 10, wherein the at least one illuminant comprises at least one light bar, or at least one light strip, or combination of at least one light bar and at least one of light strip.

18. The vehicle according to claim 10, wherein an inner wall of the transparent longitudinal rod is electroplated with a silver layer.

* * * * *